(12) United States Patent
Bruno et al.

(10) Patent No.: US 9,641,246 B2
(45) Date of Patent: May 2, 2017

(54) OPTICAL MONITORING IN AN OPTICAL COMMUNICATIONS NETWORK

(71) Applicant: Telefonaktiebolaget L M Ericsson (publ), Stockholm (SE)

(72) Inventors: Gianmarco Bruno, Genoa (IT); Alberto Deho, Genoa (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/898,225

(22) PCT Filed: Jun. 18, 2013

(86) PCT No.: PCT/EP2013/062593
§ 371 (c)(1),
(2) Date: Dec. 14, 2015

(87) PCT Pub. No.: WO2014/202120
PCT Pub. Date: Dec. 24, 2014

(65) Prior Publication Data
US 2016/0149638 A1    May 26, 2016

(51) Int. Cl.
*H04B 10/079*    (2013.01)
*H04B 10/07*    (2013.01)
*H04B 10/85*    (2013.01)

(52) U.S. Cl.
CPC ........... *H04B 10/079* (2013.01); *H04B 10/07* (2013.01); *H04B 10/85* (2013.01)

(58) Field of Classification Search
USPC ............................................. 398/39–40, 33
See application file for complete search history.

(56) References Cited

U.S. PATENT DOCUMENTS 4,741,585 A * 5/1988 Uken ................... G02B 6/4201
                                                      359/900
5,159,481 A   10/1992 Maeda
(Continued)

FOREIGN PATENT DOCUMENTS

EP    2091176 A1    8/2009
JP    7154330 A     6/1995
(Continued)

OTHER PUBLICATIONS

PCT International Search Report, mailed Feb. 21, 2014, in connection with International Application No. PCT/EP2013/062593, all pages.

(Continued)

*Primary Examiner* — Agustin Bello
(74) *Attorney, Agent, or Firm* — Leffler Intellectual Property Law, PLLC

(57) ABSTRACT

A communications network element comprises a network element input, a network element output and a monitoring port. An optical splitting device taps a portion of an input optical signal or an output optical signal to form a first signal. An optical signal transforming apparatus applies an optical transfer function to the first signal to form the optical monitoring signal applied to the monitoring port. The optical transfer function preserves the spectral property of the first signal and applies a time-domain obfuscation to the tapped signal. The optical signal transforming apparatus comprises an optical through signal path, an optical splitting device positioned in the optical through signal path and an optical combining device positioned in the optical through signal path. An optical feedback path is connected to the optical splitting device and the optical combining device. The optical splitting device is arranged to tap off a portion of a signal passing along the through signal path and apply it to the feedback path, and the optical combining device is (Continued)

arranged to recombine at least part of the tapped portion of the signal with the signal passing along the through signal path.

15 Claims, 8 Drawing Sheets

(56) References Cited

U.S. PATENT DOCUMENTS

| | | | | |
|---|---|---|---|---|
| 8,265,483 | B2* | 9/2012 | Saperstein | H04J 14/06 398/147 |
| 9,197,330 | B2* | 11/2015 | Bruno | H04B 10/85 |
| 2010/0054737 | A1* | 3/2010 | Saperstein | H04J 14/06 398/65 |
| 2013/0039646 | A1* | 2/2013 | Bruno | H04B 10/85 398/16 |
| 2015/0128223 | A1* | 5/2015 | Magri | H04L 45/42 726/4 |
| 2015/0135319 | A1* | 5/2015 | Costantini | H04J 14/0227 726/23 |
| 2016/0119056 | A1* | 4/2016 | Costantini | H04B 10/85 726/4 |
| 2016/0149638 | A1* | 5/2016 | Bruno | H04B 10/079 398/25 |

FOREIGN PATENT DOCUMENTS

| | | |
|---|---|---|
| WO | 2009040144 A1 | 4/2009 |
| WO | 2011103930 A1 | 9/2011 |
| WO | 2013007283 A1 | 1/2013 |

OTHER PUBLICATIONS

PCT International Search Report, mailed Dec. 6, 2010, in connection with International Application No. PCT/EP2010/052499, all pages.

Etemad, S. et al. "An Overlay Photonic Layer Security Approach Scalable to 100 Gb/s" IEEE Communications Magazine, IEEE Service Center, Piscataway, US, vol. 46, No. 8, Aug. 1, 2008, pp. 32-39, XP011232708, ISSN: 0163-6804, DOI: 10.1109/MCOM.2008.4597101.

ITU-T G.697 Series G: Transmission Systems and Media, Digital Systems and Networks—Transmission media and optical systems characteristics—Characteristics of optical systems—Optical monitoring for dense wavelength division multiplexing systems, Nov. 2009, 38 pages.

ITU-T G.697 Series G: Transmission Systems and Media, Digital Systems and Networks—Transmission media and optical systems characteristics—Characteristics of optical systems—Optical monitoring for dense wavelength division multiplexing systems, Feb. 2012, 40 pages.

ITU-T X.805 Series X: Data Networks and Open System Communications—Security—Security architecture for systems providing end-to-end communications, Oct. 2003, 28 pages.

Jung, Y. J. et al. "Demonstration of 10 Gbps, all-optical encryption and decryption system utilizing SOA XOR logic gates" Opt Quant Electron (2008) 40: pp. 425-430, DOI 10.1007/s11082-008-9224-7, Springer.

Annovazzi-Lodi, V. et al. "Message Encryption by Phase Modulation of a Chaotic Optical Carrier" IEEE Photonics Technology Letters, vol. 19, No. 2, pp. 76-78, Jan. 15, 2007.

Gianmarco Bruno et al., Securing Optical Monitoring Ports of Transmission Network Elements, Photonics Technologies, 2014, Fotonica AEIT Italian Conference, pp. 1-3, May 12-14, 2014.

Non-Final Office Action issued on Oct. 20, 2014 in connection with U.S. Appl. No. 13/579,932, filed Oct. 16, 2012.

Final Office Action issued Mar. 6, 2015 in connection with U.S. Appl. No. 13/579,932, filed Oct. 16, 2012.

Notice of Allowance issued Jul. 14, 2015 in connection with U.S. Appl. No. 13/579,932, filed Oct. 16, 2012.

* cited by examiner

OPTICAL MONITORING IN AN OPTICAL COMMUNICATIONS NETWORK

TECHNICAL FIELD

This invention relates to a communications network element and to monitoring a signal in an optical communications network element.

BACKGROUND

Optical monitoring of optical signals is very important in ensuring the correct operation of optical communications networks. The relevant standard for optical monitoring is set out in the International Telecommunications Union document ITU-T G.697 "Optical monitoring for Dense Wavelength Division Multiplexing Systems (DWDM) systems Series G: Transmission Systems and Media, Digital Systems and Networks Transmission Media Characteristics—Characteristics of optical components and subsystems".

Optical monitoring points in a communications network typically comprise an optical splitter arranged to extract between 1% and 10% of the optical signal that is to be monitored, the extracted signal being provided to a monitoring port. All of the traffic carried by the optical signal being monitored is replicated in the extracted signal and is provided to the monitoring port. There is a resulting problem that live traffic is vulnerable to eavesdropping at the monitoring port and this presents a problem of communications network security.

WO 2011/103930 A1 describes a communications network element with a monitoring port. Optical signal transforming apparatus applies an optical transfer function (OTF) to a tapped signal. This preserves a spectral property of the tapped signal and applies a time-domain obfuscation to the tapped signal.

SUMMARY

The present invention seeks to provide an alternative way of providing an optical monitoring signal.

An aspect of the present invention provides a communications network element comprising a network element input arranged to receive an input optical signal having a first spectral property, a network element output arranged to output an output optical signal having a second spectral property and a monitoring port arranged to output an optical monitoring signal. The communications network element further comprises a first optical splitting device arranged to tap a portion of one of the input optical signal and the output optical signal to form a first signal having one of the first spectral property and the second spectral property. The communications network element further comprises an optical signal transforming apparatus having an input and an output. The input is arranged to receive the first signal and to apply an optical transfer function to the first signal to form the optical monitoring signal. The optical transfer function is arranged to preserve the spectral property of the first signal and to apply a time-domain obfuscation to the tapped signal. The optical signal transforming apparatus is further arranged to provide the optical monitoring signal to the output and to the monitoring port. The optical signal transforming apparatus comprises an optical through signal path between the input and the output. The optical signal transforming apparatus further comprises a second optical splitting device positioned in the optical through signal path. The optical signal transforming apparatus further comprises an optical combining device positioned in the optical through signal path. The optical signal transforming apparatus further comprises an optical feedback path connected to the second optical splitting device and the optical combining device, wherein the second optical splitting device is arranged to tap off a portion of a signal passing along the through signal path and apply it to the feedback path. The optical combining device is arranged to recombine at least part of the tapped portion of the signal with the signal passing along the through signal path.

The communications network element is thus arranged so that an optical monitoring signal may be formed from an input optical signal or an output optical signal, in which any traffic carried by the input optical signal or the output optical signal is obfuscated in the time-domain and in which a spectral property of the input optical signal or the output optical signal is preserved. The communications network element is thus arranged so that optical monitoring of the input optical signal or the output optical signal may be carried out while making it difficult or impossible for traffic on the input signal or the output signal to be intercepted by eavesdropping on the optical monitoring signal. The communications network element may be used to provide communications network security in the Infrastructure Security Layer, and may be used to provide Communication security for the Management Plane, as defined in ITU-T X.805, without requiring any knowledge of the traffic to be protected (as is needed for encryption based methods of communications security) and without requiring any passwords or authentication mechanisms.

The optical signal transforming apparatus has the effect of generating intentional multi-path-interference (MPI). This interference comprises a superimposition of a large (possibly infinite) number of delayed and attenuated copies of the signal itself.

Advantageously, the optical transfer function of the optical signal transforming apparatus is variable.

Advantageously, the first spectral property and the second spectral property comprise one of optical power, power spectral density, wavelength, frequency, and optical signal-to-noise ratio.

Advantageously, the input optical signal and/or the output optical signal are traffic-carrying signals.

Advantageously, the communications network element further comprises an optical signal processing apparatus arranged to receive the input optical signal and to form the output optical signal. The optical signal processing apparatus can comprise, for example, one or more of an optical amplifier, an optical leveller, a switch, optical dispersion compensation apparatus, an optical multiplexer and an optical demultiplexer.

The first optical splitting device can be positioned on the network element input side of the optical signal processing apparatus. Alternatively, the first optical splitting device can be positioned on the network element output side of the optical signal processing apparatus. Alternatively, there can be an instance of the first optical splitting device positioned on the network element input side of the optical signal processing apparatus and a further instance of the first optical splitting device positioned on the network element output side of the optical signal processing apparatus.

Advantageously, the optical signal transforming apparatus further comprises a delay element.

The optical combining device can be located in the optical through signal path at a position which is nearer to the input than the second optical splitting device.

The optical signal transforming apparatus can comprise a four-port coupler comprising a first input port and a first output port coupled to the optical through signal path, and a second input port and a second output port coupled to the optical feedback path.

The four port coupler can have a fixed or a variable coupling ratio.

The optical signal transforming apparatus can comprise a first mirror positioned in the optical through signal path, the first mirror being transparent on a first side so as to pass an optical signal along the through signal path. The optical signal transforming apparatus can further comprise a second mirror at a spaced apart position from the first mirror along the optical through signal path, the second mirror being partially reflective and arranged to pass a first portion of light passing along the through signal path and to reflect a second portion of light passing along the through signal path to the optical feedback path. The optical signal transforming apparatus can comprise at least a third mirror at a position offset from the first mirror and the second mirror to form the optical feedback path. The first mirror is reflective on a second side so as to direct light from the optical feedback path along the optical through signal path.

The optical transfer function of the optical signal transforming apparatus can be variable by at least one of: a variable length of the optical feedback path; and a variable reflectivity of the second mirror.

The communications network element can be used with any modulation format and bit-rates (e.g. of up to 100 Gbit/s or more). Applying a time-domain obfuscation may allow the communications network element to be used with an input optical signal or an output optical signal comprising a plurality of optical channels. The communications network element may therefore be used to form an optical monitoring signal for all of the optical channels in a wavelength division multiplexed (WDM) optical signal.

In an embodiment, the input spectral property and the output spectral property comprises one of optical power, power spectral density, wavelength, frequency, and optical signal-to-noise ratio. An optical monitoring signal may therefore be provided on which optical monitoring be performed by measuring optical power or by making a frequency-domain measurement.

Another aspect provides an optical communications network comprising a communications network element as described or claimed.

Another aspect provides a method of monitoring an optical signal in a communications network element, comprising receiving an optical signal having a spectral property. The method further comprises splitting off a part of the optical signal to form a tapped signal having a spectral property. The method further comprises applying an optical transfer function to the tapped signal to form an optical monitoring signal, the optical transfer function being arranged to preserve the signal property of the tapped signal and to apply a time-domain obfuscation to the tapped signal. The method further comprises providing the optical monitoring signal to a monitoring port of the communications network element. The step of applying the optical transfer function comprises providing an optical through signal path. The step of applying the optical transfer function further comprises splitting off a portion of a signal passing along the optical through signal path and applying the signal portion to an optical feedback path. The step of applying the optical transfer function further comprises recombining at least part of the signal portion from the optical feedback path with the through signal path.

Traffic is used herein to mean a modulation of the optical signal to carry data or other information.

BRIEF DESCRIPTION OF THE DRAWINGS

Embodiments of the invention will be described, by way of example only, with reference to the accompanying drawings in which.

DETAILED DESCRIPTION

Figure 1:
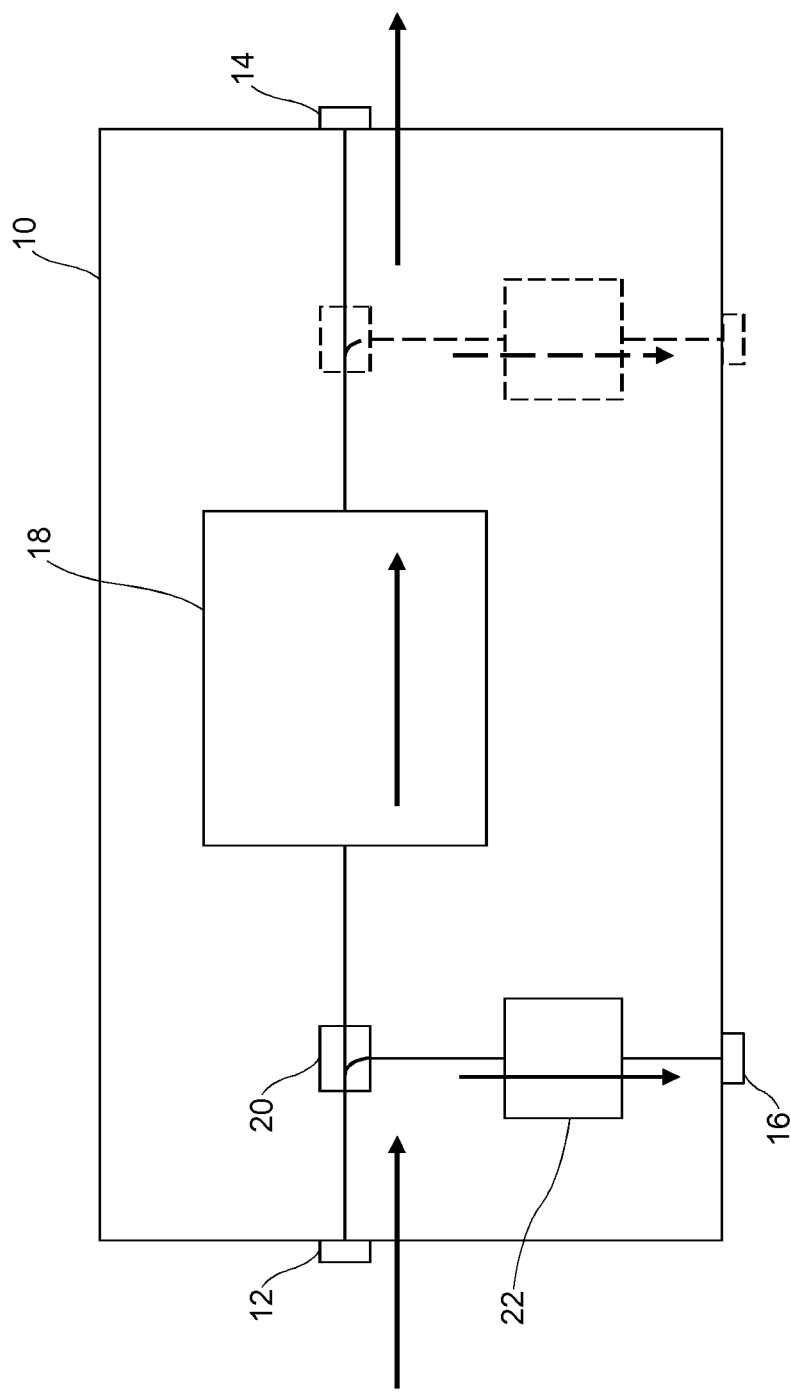
FIG. 1 shows an embodiment of a communications network element with a single monitoring port.

FIG. 1 shows a communications network element 10 comprising an input 12, an output 14, a monitoring port 16, optical signal processing apparatus 18, an optical splitting device 20 and optical signal transforming apparatus 22.

The input 12 is arranged to receive an input optical signal having an input spectral property and carrying input traffic. The output 14 is arranged to output an output optical signal. The monitoring port 16 is arranged to output an optical monitoring signal. The optical signal processing apparatus 18 is arranged to receive the input optical signal and to form the output optical signal. The resulting output optical signal has an output spectral property and carries output traffic. The optical signal processing apparatus 18 may comprise any such apparatus at which it is desirable to monitor the input optical signal or the output optical signal. The optical signal processing apparatus 18 may be selected from, but is not limited to, one or a combination of, an optical amplifier, an optical leveller, a switch, a wavelength selective switch, optical dispersion compensation apparatus, an optical multiplexer and an optical de-multiplexer.

The optical splitting device 20 is arranged, in this example, to tap off a part of the input optical signal to form a tapped signal. The optical splitting device 20 can be any device which is capable of tapping a part of the input optical signal, and can include devices such as an optical coupler and a partially reflective mirror. The tapped signal has a spectral property comprising the input spectral property and carries traffic comprising the input traffic. The tapped signal therefore replicates the spectral property and traffic of the input optical signal. The optical splitting device 20 may alternatively be provided on the other side of the optical signal processing apparatus 18 (shown in dashed form in FIG. 1). In this case, the optical splitting device is arranged to tap off a part of the output optical signal to form the tapped signal, which would then have the output spectral property and carry the output traffic.

The optical signal transforming apparatus 22 is arranged to receive the tapped signal and to apply an optical transfer function (OTF) to the tapped signal to form an optical monitoring signal. The OTF is arranged to preserve the spectral property of the tapped signal and to apply a time-domain obfuscation to the tapped signal. An optical monitoring signal is thereby formed which has the spectral property of the tapped signal and on which the traffic carried by the tapped signal has been obfuscated in the time-domain. The optical signal transforming apparatus 22 is further arranged to provide the optical monitoring signal to the monitoring port 16. Embodiments of the optical signal transforming apparatus 22 are described in more detail below.

Figure 2:
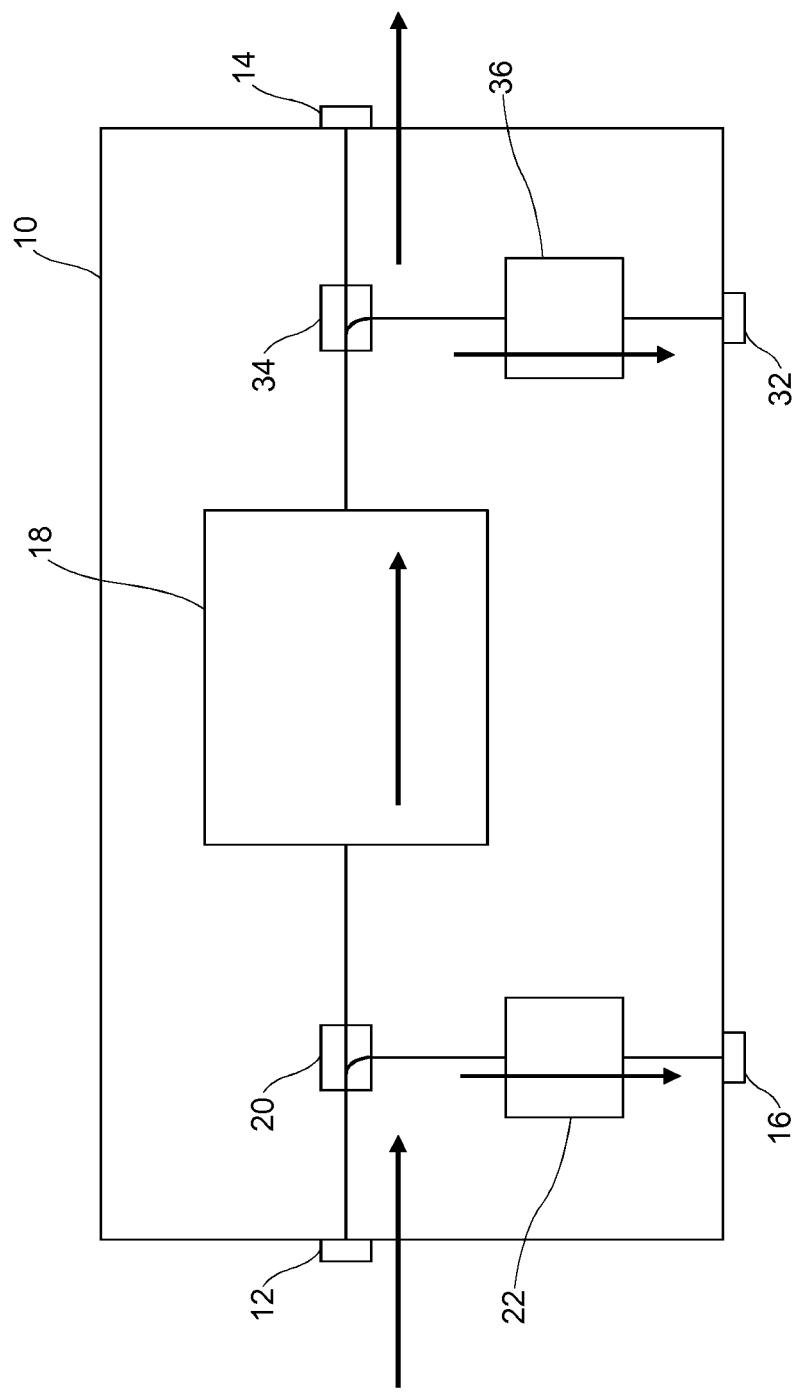
FIG. 2 shows an embodiment of a communications network element with two monitoring ports.

FIG. 2 shows a communications network element 10 which is similar to that shown in FIG. 1. The communications network element 10 further comprises a second optical splitting device 34, provided on the output side of the optical signal processing apparatus 18. A second optical signal transforming apparatus 36 and a second monitoring port 32 are also provided. The second optical splitting device 34 is arranged to tap off a part of the output optical signal, to form a second tapped signal having the output spectral property and carrying the output traffic. The second optical signal transforming apparatus 36 is arranged to receive the second tapped signal and to apply a second OTF to the second tapped signal to form a second optical monitoring signal. The second OTF is arranged to preserve the spectral property of the second tapped signal and to apply a time-domain obfuscation to the second tapped signal. The second optical signal transforming apparatus 36 is further arranged to provide the second optical monitoring signal to the second monitoring port 32.

The communications network element 30 is thus arranged to allow optical monitoring signals to be provided from both the input optical signal and the output optical signal.

In FIG. 1 or 2, the monitoring ports 16, 32 can be external monitoring points (EMP) as defined in ITU-T G.697. The monitoring ports 16, 32 can be used for frequency-domain monitoring, such as measuring one or more of: carrier frequency, peak power, power spectral density and signal-to-noise ratio.

Figure 3:
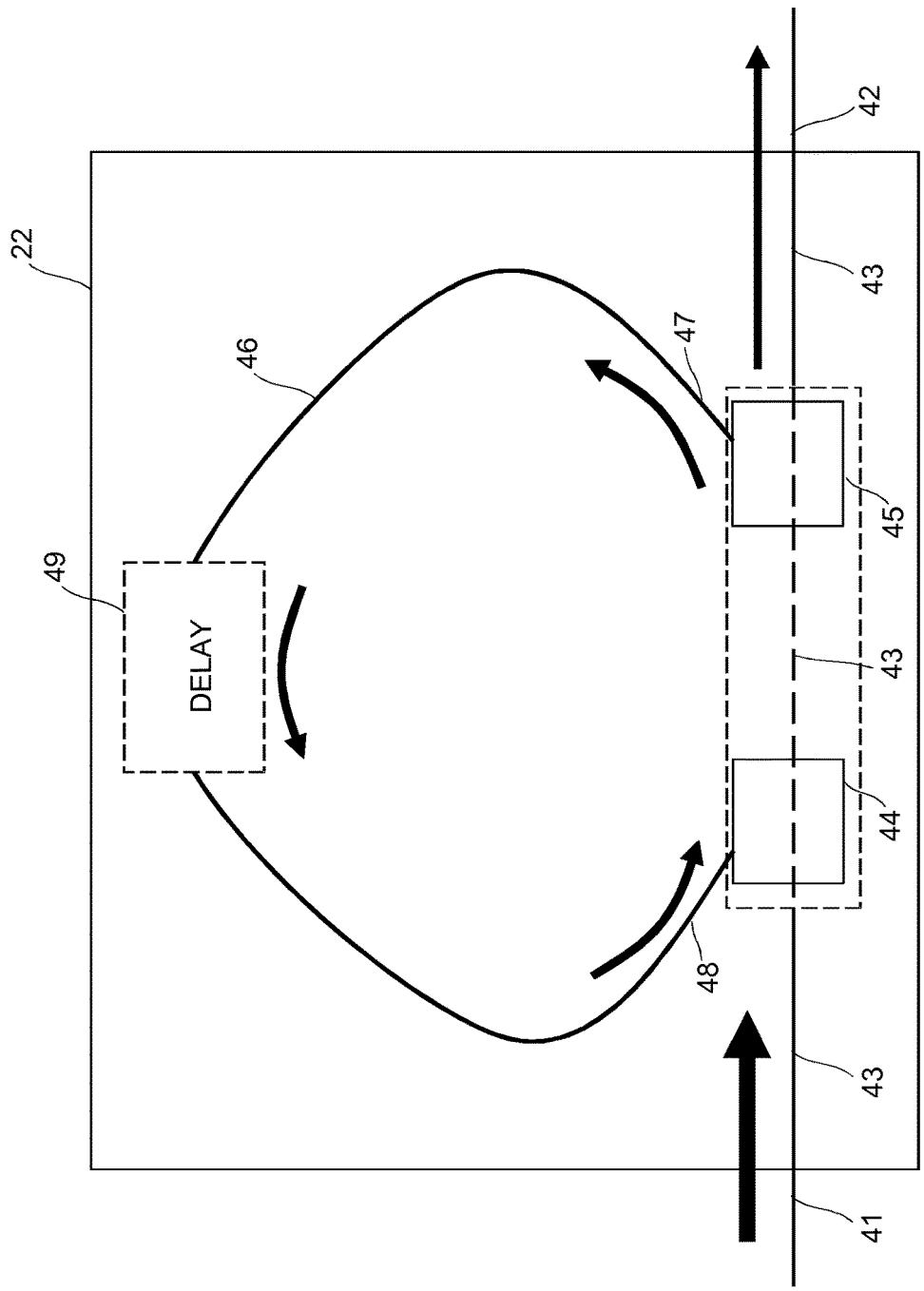
FIG. 3 shows an optical signal processing apparatus for use in the communications network element.

FIG. 3 schematically gives an overview of an optical signal processing apparatus 22 according to embodiments. The optical signal processing apparatus 22 comprises an input 41, an output 42 and an optical through signal path 43 connecting the input 41 to the output 42. An optical splitting device 45 and an optical combining device 44 are positioned in the optical through signal path 43. In at least one embodiment, the optical combining device 44 can be located at a position along the through signal path 43 which is nearer the input 41 than the optical splitting device 45, i.e. the optical combining device 44 is upstream of the optical splitting device 45. In at least one embodiment, the optical combining device 44 is co-located with the optical splitting device 45 along the optical through signal path 43.

An optical feedback path 46 is connected to the optical splitting device 45 and the optical combining device 44. The optical feedback path 46 has a feedback path input 47 and a feedback path output 48. The optical splitting device 45 is arranged to tap off a portion of a signal passing along the through signal path 43 and apply it to the feedback path 46. The optical combining device 44 is arranged to recombine at least part of the tapped portion of the signal with the signal passing along the through signal path 43.

The optical splitting device 45 can be any device which is capable of tapping off a portion of the optical signal flowing along the path 43. Examples of possible devices include an optical splitter and a partially reflective mirror. These devices can be wavelength selective or not wavelength selective.

The optical combining device 44 can be any device which is capable of combining two optical signals. Examples of possible devices include an optical coupler, either wavelength selective or not, a mirror which is reflective on one side and (at least partially) transparent on the other side.

Optionally, a delay element 49 can be provided in the feedback path. In use, an optical signal is received at input 41 and flows along the through signal path 43. At splitter/coupler 45 a portion of the signal on the through signal path 43 is split off, and flows along the feedback path 46. One implementation of the delay element 49 is an optical fibre patch. The delay element 49 may exhibit high birefringence to provide further distortion.

Advantageously, an optical signal may pass around the feedback path 46 on multiple occasions. This creates multiple versions of the original signal received at input 41, where the multiple versions are delayed by varying amounts of time. This obfuscates the signal applied to output 42 and monitoring port 16.

Figure 4B:
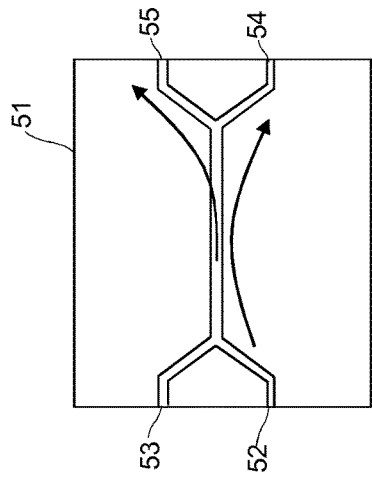
FIGS. 4B and 4C show signal paths through the four-port coupler of FIG. 4A.
Figure 4C:
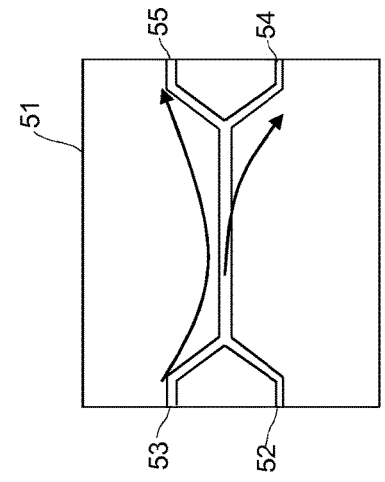
Figure 4A:
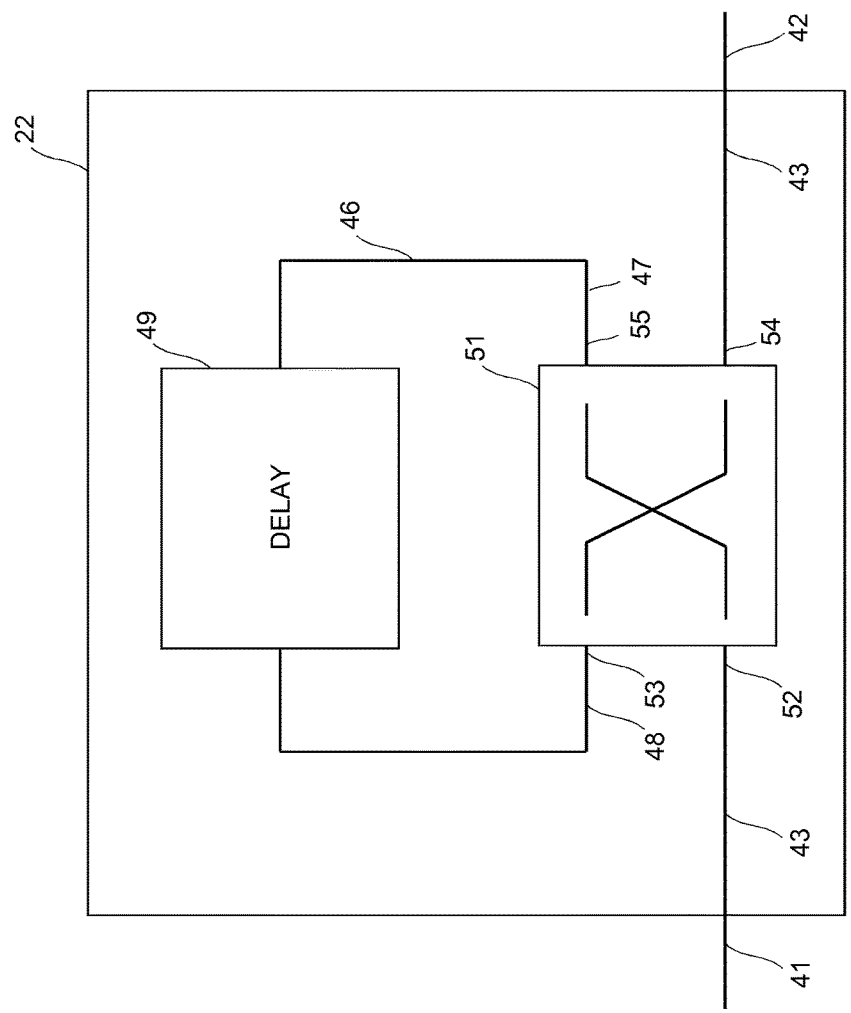
FIG. 4A shows an optical signal processing apparatus using a four-port coupler.

FIGS. 4A-4C show an optical signal processing apparatus 22 according to an embodiment. The optical signal processing apparatus 22 comprises an input 41, an output 42 and an optical through signal path 43 connecting the input 41 to the output 42. An optical feedback path 46 has a feedback path input 47 and a feedback path output 48. A four-port coupler 51 is positioned in the optical through signal path 43. The four-port coupler 51 has a first input port 52, a second input port 53, a first output port 54 and a second output port 55. The first input port 52 and the first output port 54 are coupled to the optical through signal path 43. The second input port 53 and the second output port 55 are coupled to the optical feedback path 46. A delay element 49 can be provided in the feedback path 46. The four-port coupler 51 has a transfer function defined as:

$$\begin{pmatrix} E_{1,out} \\ E_{2,out} \end{pmatrix} = \begin{pmatrix} \sqrt{1-\alpha} & j\sqrt{\alpha} \\ j\sqrt{\alpha} & \sqrt{1-\alpha} \end{pmatrix} \cdot \begin{pmatrix} E_{1,in} \\ E_{2,in} \end{pmatrix}$$

where: α is 0.5 for a 3 dB coupler (i.e. a 50:50 coupler). The value α can be changed to obtain any desired coupling ratio, such as a 10:90, 1:99 couplers and so on. The four-port coupler 51 performs the functions of the optical splitting device 45 and the optical combining device 44 shown in FIG. 3. FIGS. 4B and 4C show signal flows through the four-port coupler. Firstly, FIG. 4B shows signal flows for an optical signal received on the first input port 52. A first portion of the signal received at port 52 flows to the first output port 54. A second portion of the signal received at port 52 flows to the second output port 55. The ratio of signal portions reaching ports 54 and 55 is determined by the transfer function of the coupler 51, as described above. Secondly, FIG. 4C shows signal flows for an optical signal received on the second input port 53, connected to the feedback path 46. A first portion of the signal received at port 53 flows to the first output port 54 and reaches output 42 of apparatus 22. A second portion of the signal received at port 53 flows to the second output port 55 and remains within the feedback path 46. This creates a portion of the signal originally received at port 52 which is delayed by a multiple number of trips around the feedback path 46. The ratio of signal portions reaching ports 54 and 55 is determined by the transfer function of the coupler 51, as described above. The signal flows shown in FIGS. 5B and 5C occur simultaneously. In this embodiment, the optical splitting device 45 and optical combining device 44 of FIG. 3 are implemented by the four-port coupler 51 and are substantially co-located along the optical through signal path 43.

The delay element 49 increases propagation time of a signal between port 55 and port 53. The delay element 49 can be implemented as a delay element having one fixed delay value, a delay element having a plurality of fixed delay values which can be selected between, or a delay element which can provide a delay value which varies over time. As a non-limiting example, the delay element can have any integer number of symbol periods. The delay element can have a delay which is not an integer number of symbol periods.

As described above for FIG. 3, an optical signal may pass around the feedback path 46 multiple times. This creates multiple versions of the original signal received at input 41, where the multiple versions are delayed by varying amounts of time. This obfuscates the signal applied to output 42 and monitoring port 16.

Figure 5A:
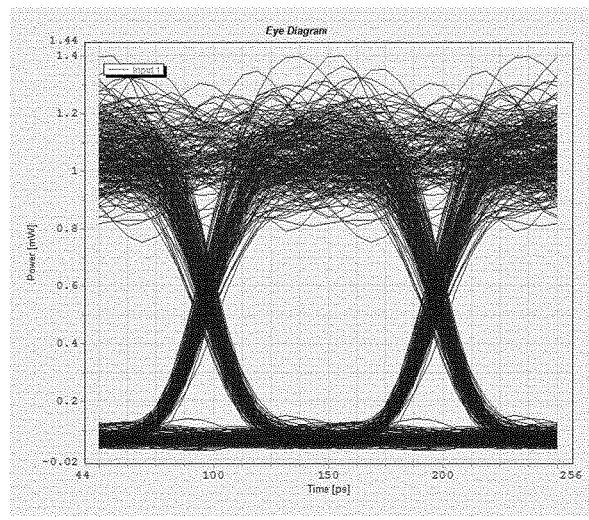
FIG. 5A shows a time-domain signal of an input signal.
Figure 5B:
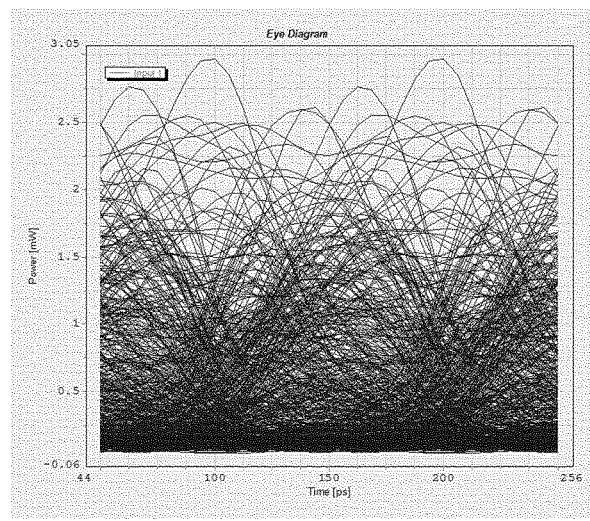
FIG. 5B shows a time-domain signal of an obfuscated monitoring signal.
Figure 5C:
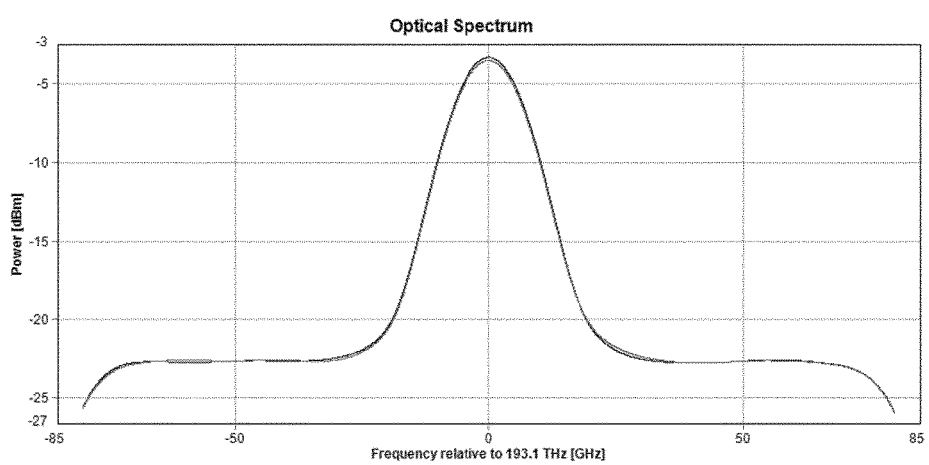
FIG. 5C shows an optical spectrum of the signal of FIG. 5B.

FIG. 5A shows a modulated optical signal received at port 12 or at port 14, and FIG. 5B shows an optical signal at port 16, after obfuscation using an apparatus such as that shown in FIG. 4. FIG. 5C shows the combined spectra of the original (wanted) signal and the time-delayed versions of the wanted signal which have been created by the feedback path. At least some spectral properties of the optical signal have been preserved in the signal shown in FIGS. 5B and 5C. The preserved spectral properties are properties which are used for monitoring purposes, such as: carrier frequency, peak power, power spectral density and signal-to-noise ratio.

Figure 6:
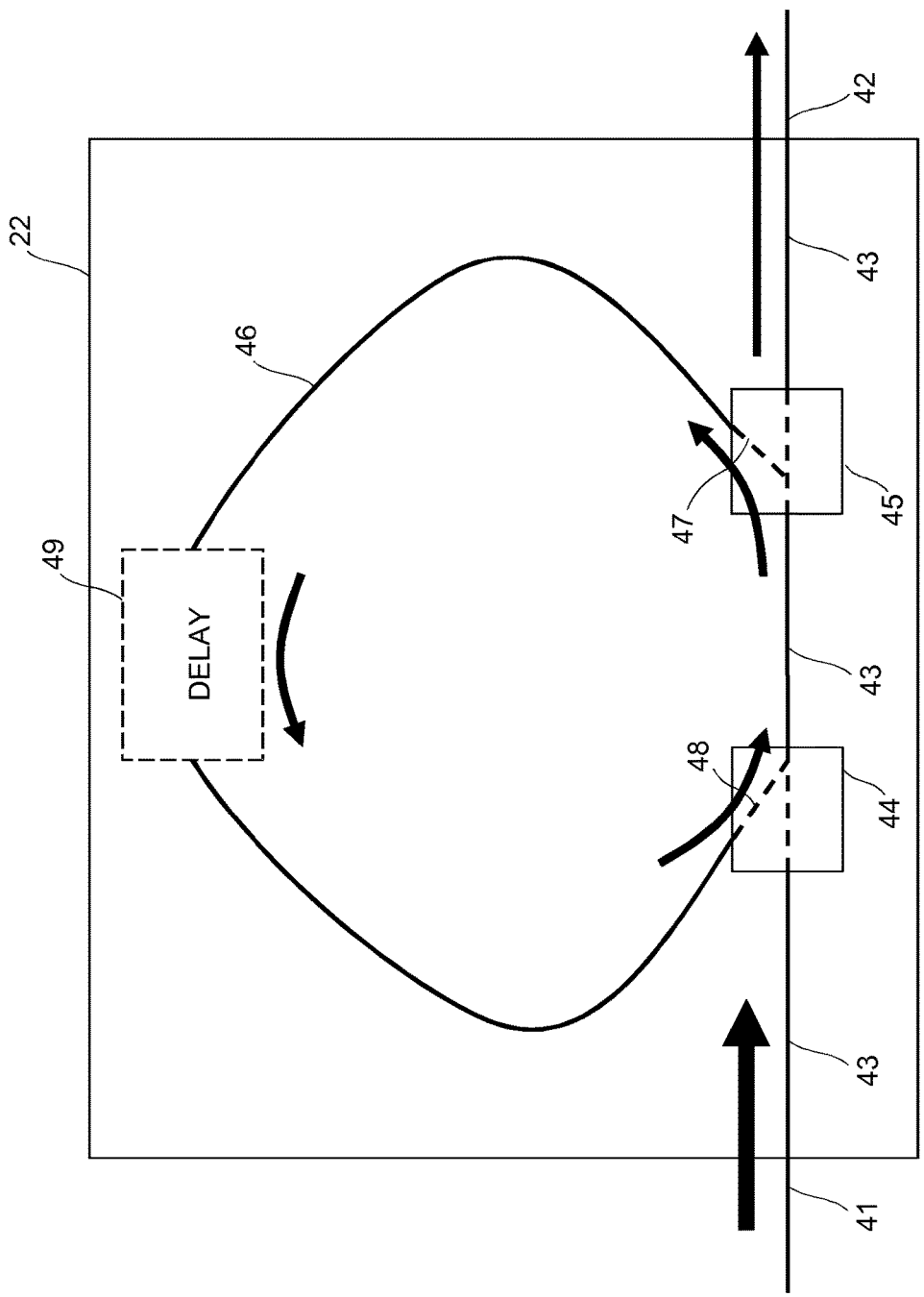
FIG. 6 shows an optical signal processing apparatus for use in the communications network element.

FIG. 6 shows an optical signal processing apparatus 22 according to an embodiment. This embodiment operates in a similar way to FIG. 4, but with two three-port couplers 44, 45 in place of the four-port coupler 51. The optical signal processing apparatus 22 comprises an input 41, an output 42 and an optical through signal path 43 connecting the input 41 to the output 42. An optical splitting device 45 and an optical combining device 44 are positioned in the optical through signal path 43. The optical combining device 44 is at a position along the through signal path 43 which is nearer the input 41 than the optical splitting device 45, i.e. the optical combining device 44 is upstream of the optical splitting device 45. An optical feedback path 46 is connected to the optical splitting device 45 and the optical combining device 44. The optical feedback path 46 has a feedback path input 47 and a feedback path output 48. The optical splitting device 45 is arranged to tap off a portion of a signal passing along the through signal path 43 and apply it to the feedback path 46. The optical combining device 44 is arranged to recombine at least part of the tapped portion of the signal with the signal passing along the through signal path 43.

The optical splitting device 45 can be any device which is capable of tapping off a portion of the optical signal flowing along the path 43. Examples of possible devices include an optical coupler, a partially reflective mirror.

The optical combining device 44 can be any device which is capable of combining two optical signals. Examples of possible devices include an optical coupler, a mirror which is reflective on one side and (at least partially) transparent on the other side.

Optionally, a delay element 49 can be provided in the feedback path. In use, an optical signal is received at input 41 and flows along the through signal path 43. At splitter/coupler 45 a portion of the signal on the through signal path 43 is split off, and flows along the feedback path 46.

Due to the position of the feedback path output 48 and feedback path input 47, it is possible that an optical signal may pass around the feedback path multiple occasions. This creates multiple versions of the original signal received at input 41, where the multiple versions are delayed by varying amounts of time. This obfuscates the signal applied to output 42 and monitoring port 16.

Figure 7:
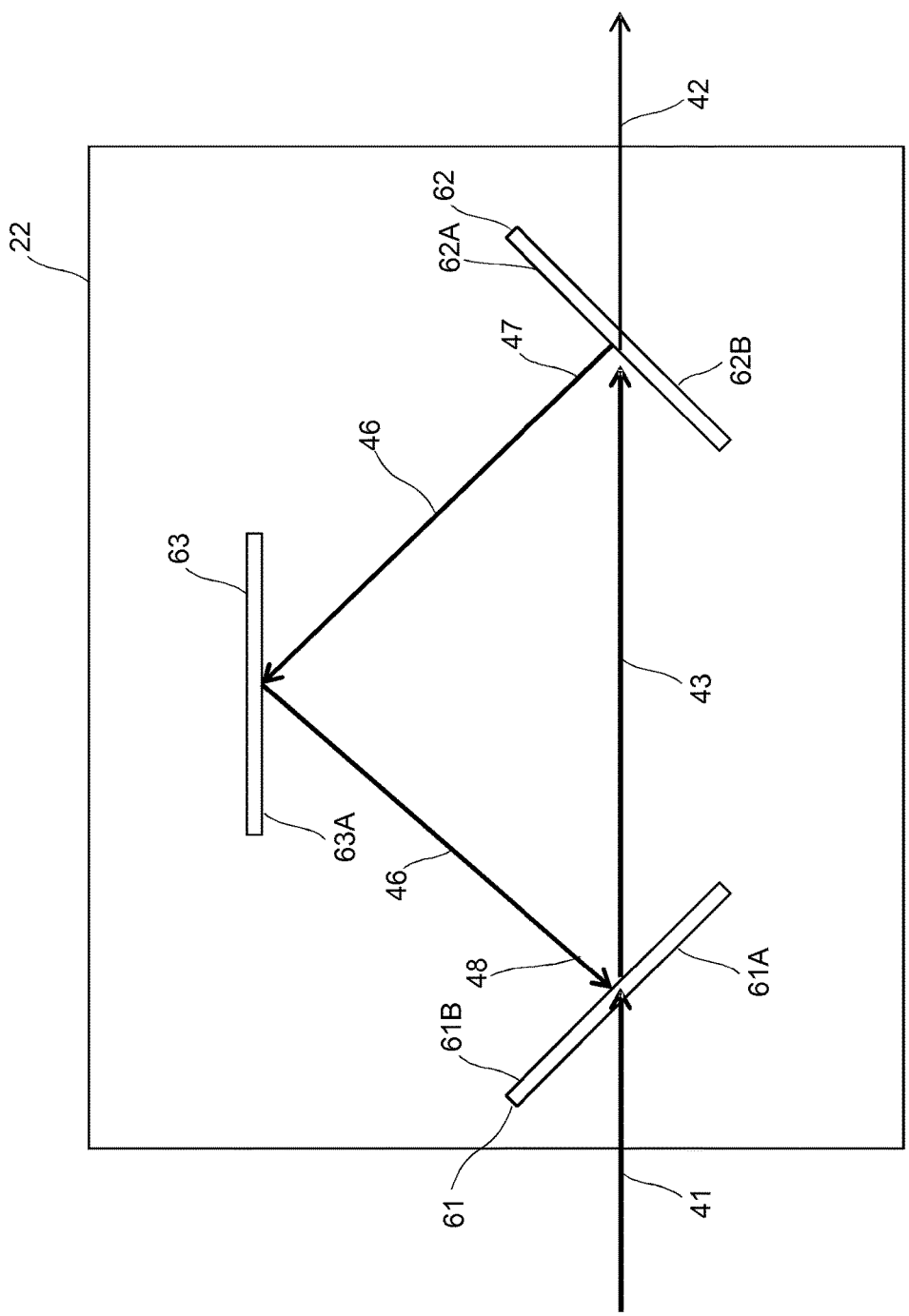
FIG. 7 shows an optical signal processing apparatus using a set of mirrors.

FIG. 7 shows an optical signal processing apparatus 22 according to another embodiment. The optical signal processing apparatus 22 comprises an input 41, an output 42 and an optical through signal path 43 connecting the input 41 to the output 42. An optical feedback path 46 has a feedback path input 47 and a feedback path output 48. A first mirror 61 is positioned in the optical through signal path 43. The first mirror 61 is transparent on a first side 61A so as to pass an optical signal received from input 41 along the through signal path 43. A second mirror 62 is mounted at a spaced apart position from the first mirror 61 along the optical through signal path 43. The second mirror is partially reflective on a side 62A. This allows a first portion of light passing along the through signal path 43 to pass through the mirror 62 towards the output 42 and a second portion of light passing along the through signal path 43 to be reflected along the optical feedback path 46 towards the third mirror 63. The third mirror 63 is mounted at a position which is offset from both the first mirror 61 and the second mirror 62 to form the optical feedback path 46. The third mirror 63 is fully reflective on side 63A. The first mirror 61 is fully reflective on a second side, 61B, so as to direct light from the optical feedback path 46 back along the optical through signal path 43. It can be seen that the first mirror 61 performs the function of the optical combining device 44 shown in FIG. 6, and that the second mirror 62 performs the function of the splitting device 45 shown in FIG. 6. In this embodiment a portion of the optical signal received at input 41 undergoes multiple reflections via mirrors 62, 63 and 63 (in that order). Some of the optical signal received at input 41 will travel around the feedback path 46 multiple times. The portion of the optical signal received at input 41 which is applied to the feedback path (and therefore the relative amplitude of copies of the optical signal compared to the optical signal received at input 41) is determined by the reflectivity ratio of at least the mirror 62. relative delay between the original signal received at input 41 and (attenuated) copies of the optical signal is determined by the spacing of the mirrors, which determines the path length of the feedback path 46.

While a set of three mirrors 61, 62, 63 are shown in FIG. 7, further mirrors can be provided. For example, additional mirrors can be provided along the feedback path to increase the length of the feedback path 46.

The optical transfer function (OTF) of the apparatus 22 shown in FIG. 7 can be varied in several possible ways. For example, where there is a plurality of mirrors in the feedback path, the length of the optical feedback path can be altered by selecting which ones of the mirrors are used to form the feedback path. The reflectivity of mirror 62 can be varied to vary the portion of light applied to the feedback path. Alternatively, the position/angle of mirror 62 can be varied such that it directs a lesser or greater amount of light into the feedback path.

As described above for other embodiments, an optical signal may pass around the feedback path 46 on multiple occasions. This creates multiple versions of the original signal received at input 41, where the multiple versions are delayed by varying amounts of time. This obfuscates the signal applied to output 42 and monitoring port 16.

In any of the embodiments, optical signal transforming apparatus 22 can have a nested configuration. A further instance of the split and recombine mechanism shown in the through path 43 can be applied to the path 46 itself to provide a further level of obfuscation. This can be implemented by a further splitting device 45, combining device 44 and feedback path 46 in the main feedback path 46. This concept can be repeated to introduce further levels to the nested configuration.

The various implementations can be optimised in order to maximise the efficacy of the obfuscation process and/or minimise the response time to input signal variations. For example, increasing a splitter ratio of splitter 45 or coupler 51, or increasing the reflectivity of side 62A of the mirror 62, will direct a higher portion of light along the feedback path 46. This can increase obfuscation of the wanted signal. Conversely, decreasing a splitter ratio of splitter 45 or coupler 51, or decreasing the reflectivity of side 62A of the mirror 62, will direct a lesser portion of light along the feedback path 46. This can reduce obfuscation of the wanted signal and can allow monitoring where there are fast-varying changes on the input signal.

Figure 8:
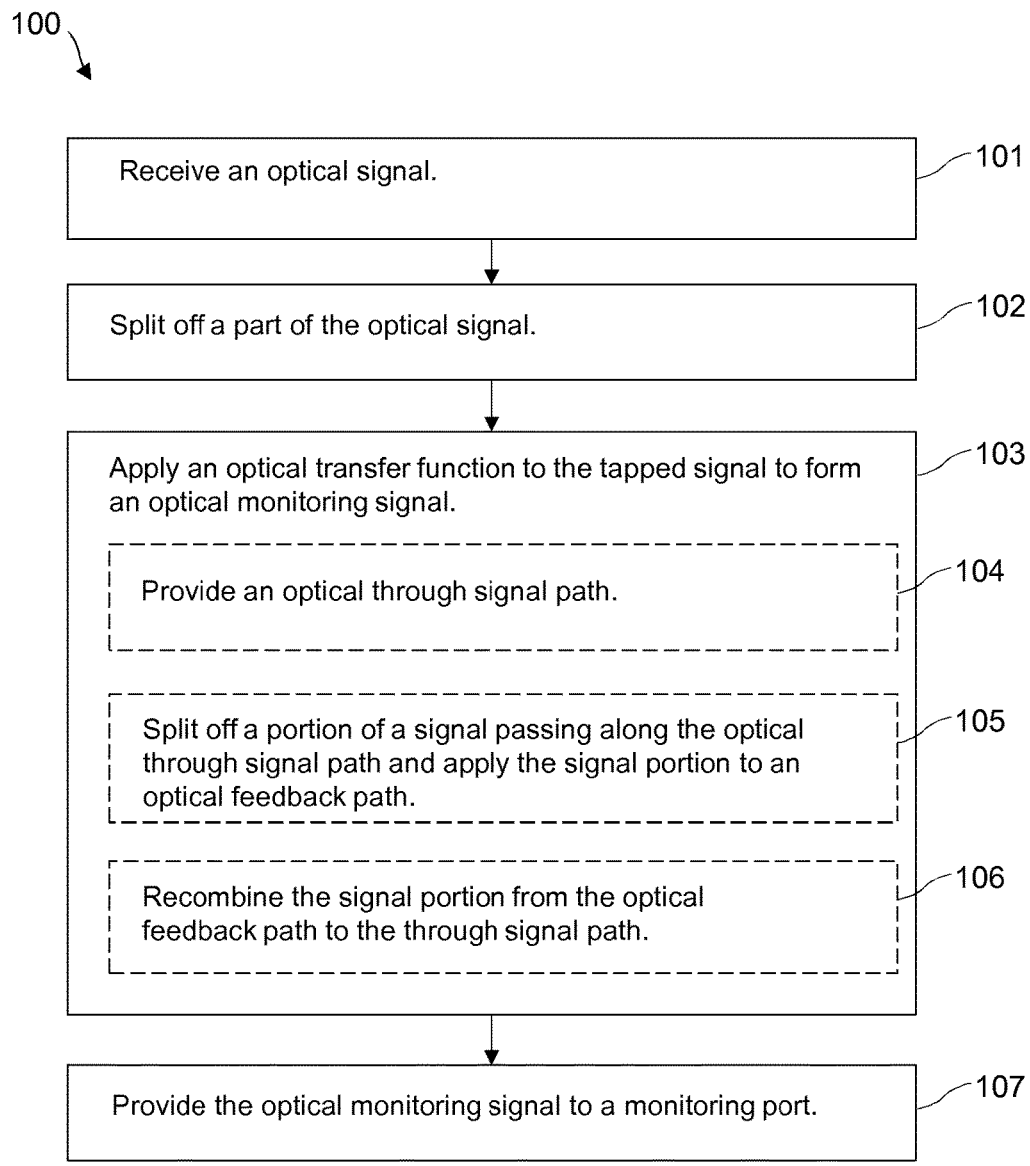
FIG. 8 shows a method of monitoring an optical signal in a communications network element.

FIG. 8 shows a method 100 of monitoring an optical signal in a communications network element. Step 101 comprises receiving an optical signal having a spectral property. Step 102 comprises splitting off a part of the optical signal to form a tapped signal having the spectral property and carrying the traffic. Step 103 comprises applying an optical transfer function to the tapped signal to form an optical monitoring signal, the optical transfer function being arranged to preserve the signal spectral property of the tapped signal and to apply a time-domain obfuscation to the tapped signal. Step 103 further comprises steps 104-106. Step 104 comprises providing an optical through signal path. Step 105 comprises splitting off a portion of a signal passing along the optical through signal path and applying the signal portion to an optical feedback path. Step 106 comprises recombining at least part of the signal portion from the optical feedback path to the through signal path at a position upstream of the first position. Step 107 comprises providing the optical monitoring signal to a monitoring port of the communications network element. The optical transfer function can be variable. The method can be performed on at least one of: an input side of an optical signal processing apparatus at the communications network element (e.g. FIG. 1, input side of optical signal processing apparatus 18); an output side of an optical signal processing apparatus at the communications network element (e.g. FIG. 1, output side of optical signal processing apparatus 18).

An embodiment can be implemented using low cost, low loss, low footprint optical components existing in the market which can be easily mass-produced.

An embodiment can be deployed in network equipment having monitoring ports.

Embodiments can be applied to optical signals having various numbers of optical traffic channels; modulation formats; and/or bit-rates. Experiments have successfully been performed with 10 G On-Off Keyed (OOK) modulated signals, 40 G and 100 G Dual Polarisation-Quadrature Phase Shift Keyed (DP-QPSK) modulated signals and 200 G Dual Polarisation-16 Quadrature Amplitude Modulated (DP-16-QAM) modulated signals.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A communications network element comprising:
    a network element input arranged to receive an input optical signal having a first spectral property;
    a network element output arranged to output an output optical signal having a second spectral property;
    a monitoring port arranged to output an optical monitoring signal;
    a first optical splitting device arranged to tap a portion of one of the input optical signal and the output optical signal to form a first signal having one of the first spectral property and the second spectral property;
    optical signal transforming apparatus having an input and an output, the input arranged to receive the first signal and to apply an optical transfer function to the first signal to form the optical monitoring signal, the optical transfer function being arranged to preserve the spectral property of the first signal and to apply a time-domain obfuscation to the tapped signal, the optical signal transforming apparatus being further arranged to provide the optical monitoring signal to the output and to the monitoring port, the optical signal transforming apparatus comprising:
    an optical through signal path between the input and the output;
    a second optical splitting device positioned in the optical through signal path;
    an optical combining device positioned in the optical through signal path;
    an optical feedback path connected to the second optical splitting device and the optical combining device, wherein the second optical splitting device is arranged to tap off a portion of a signal passing along the through signal path and apply it to the feedback path, and the optical combining device is arranged to recombine at least part of the tapped portion of the signal with the signal passing along the through signal path.

2. A communications network element according to claim 1 wherein the optical transfer function of the optical signal transforming apparatus is variable.

3. A communications network element according to claim 1 wherein the first spectral property and the second spectral property comprise one of optical power, power spectral density, wavelength, frequency, and optical signal-to-noise ratio.

4. A communications network element according to claim 1, further comprising an optical signal processing apparatus arranged to receive the input optical signal and to form the output optical signal, wherein the first optical splitting device is positioned on at least one of:
    the network element input side of the optical signal processing apparatus;
    the network element output side of the optical signal processing apparatus.

5. A communications network element according to claim 1, wherein the optical signal transforming apparatus further comprises a delay element.

6. A communications network element according to claim 1, wherein the optical combining device is located in the optical through signal path at a position which is nearer to the input than the second optical splitting device.

7. A communications network element according to claim 1, wherein the optical signal transforming apparatus comprises a four-port coupler comprising:
   a first input port and a first output port coupled to the optical through signal path;
   a second input port and a second output port coupled to the optical feedback path.

8. A communications network element according to claim 7 wherein the four-port coupler has a variable coupling ratio.

9. A communications network element according to claim 7 wherein the four-port coupler has a coupling ratio of 50:50.

10. A communications network element according to claim 1, wherein the optical signal transforming apparatus comprises:
   a first mirror positioned in the optical through signal path, the first mirror being transparent on a first side so as to pass an optical signal along the through signal path;
   a second mirror at a spaced apart position from the first mirror along the optical through signal path, the second mirror being partially reflective and arranged to pass a first portion of light passing along the through signal path and to reflect a second portion of light passing along the through signal path to the optical feedback path; and
   at least a third mirror at a position offset from the first mirror and the second mirror to form the optical feedback path,
wherein the first mirror is reflective on a second side so as to direct light from the optical feedback path along the optical through signal path.

11. A communications network element according to claim 10 wherein the optical transfer function of the optical signal transforming apparatus is variable by at least one of:
   a variable length of the optical feedback path;
   a variable reflectivity of the second mirror.

12. A method of monitoring an optical signal in a communications network element, the method comprising:
   receiving an optical signal having a spectral property;
   splitting off a part of the optical signal to form a tapped signal having a spectral property;
   applying an optical transfer function to the tapped signal to form an optical monitoring signal, the optical transfer function being arranged to preserve the signal property of the tapped signal and to apply a time-domain obfuscation to the tapped signal; and
   providing the optical monitoring signal to a monitoring port of the communications network element,
wherein the step of applying the optical transfer function comprises:
   providing an optical through signal path;
   splitting off a portion of a signal passing along the optical through signal path and applying the signal portion to an optical feedback path;
   recombining at least part of the signal portion from the optical feedback path with the through signal path.

13. A method according to claim 12 wherein the optical transfer function is variable.

14. A method according to claim 12 which is performed on at least one of:
   a network element input side of an optical signal processing apparatus at the communications network element;
   a network element output side of an optical signal processing apparatus at the communications network element.

15. An optical communications network comprising a communications network element according to claim 1.

* * * * *